United States Patent
Poschmann et al.

(10) Patent No.: US 6,537,691 B1
(45) Date of Patent: Mar. 25, 2003

(54) CONTAINER FOR RECEIVING AN OPERATING MEANS FOR THE OPERATION OF FUEL CELLS

(75) Inventors: Thomas Poschmann, Ulm (DE); Detlef Zur Megede, Kirchheim (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/807,691
(22) PCT Filed: Sep. 16, 1999
(86) PCT No.: PCT/EP99/06854
§ 371 (c)(1),
(2), (4) Date: Jun. 29, 2001
(87) PCT Pub. No.: WO00/24076
PCT Pub. Date: Apr. 27, 2000

(30) Foreign Application Priority Data

Oct. 17, 1998 (DE) .......................... 198 47 985

(51) Int. Cl.[7] .......................... H01M 8/04; H01M 8/18; H01M 2/00; H01M 2/02
(52) U.S. Cl. .............................. 429/19; 429/17; 429/34
(58) Field of Search ............... 429/12, 13, 17, 429/19, 34, 35, 38, 39

(56) References Cited

U.S. PATENT DOCUMENTS

| | | | | |
|---|---|---|---|---|
| 3,607,066 A | * | 9/1971 | Basch et al. | 423/579 |
| 3,702,532 A | * | 11/1972 | Low et al. | 60/516 |
| 3,725,236 A | * | 4/1973 | Johnson, Jr. | 204/408 |
| 4,261,956 A | * | 4/1981 | Adlhart | 422/239 |
| 4,595,469 A | * | 6/1986 | Foller | 205/510 |
| 4,619,761 A | * | 10/1986 | Franzen | 209/250 |
| 5,401,589 A | * | 3/1995 | Palmer et al. | 429/13 |
| 5,560,999 A | * | 10/1996 | Pedicini et al. | 429/27 |
| 6,074,771 A | * | 6/2000 | Cubukcu et al. | 429/30 |
| 6,126,908 A | * | 10/2000 | Clawson et al. | 422/190 |
| 6,171,574 B1 | * | 1/2001 | Juda et al. | 423/648.1 |
| 6,224,744 B1 | * | 5/2001 | Casado Gimenez et al. | 205/756 |
| 6,245,303 B1 | * | 6/2001 | Bentley et al. | 422/193 |
| 6,361,891 B1 | * | 3/2002 | Breault et al. | 429/26 |
| 6,425,440 B1 | * | 7/2002 | Tsenter et al. | 165/104.12 |

FOREIGN PATENT DOCUMENTS

| | | | | |
|---|---|---|---|---|
| DE | 33 45 778 A1 | 12/1983 | | |
| DE | 33 45 778 A | * 6/1985 | .......... F02M/37/22 |
| DE | 0 627 288 A | * 12/1994 | ............ B29B/9/16 |
| DE | 197 31 250 A1 | 7/1997 | | |
| EP | 0 627 288 A | 3/1994 | | |
| EP | 0 677 417 A1 | 2/1995 | | |
| GB | 2 250 130 A | 5/1992 | | |
| JP | 61067625 | 4/1986 | | |
| JP | 61 067625 | * 8/1986 | ........... B60K/15/02 |
| JP | 09092315 | 4/1997 | | |
| JP | 09 092315 | * 8/1997 | ............ H01M/8/04 |

* cited by examiner

*Primary Examiner*—Carol Chaney
*Assistant Examiner*—Donald V. Scaltrito
(74) *Attorney, Agent, or Firm*—Crowell & Moring LLP

(57) ABSTRACT

A container for receiving an operating medium for the operation of fuel cells has an inlet for a medium, a first outlet and a second outlet. The container is divided by at least one permeable component into at least an inlet-side interior space, and an interior space which is remote from the inlet. The first outlet is arranged in the inlet-side interior space and the second outlet is arranged in the interior space which is remote from the inlet.

12 Claims, 2 Drawing Sheets

CONTAINER FOR RECEIVING AN OPERATING MEANS FOR THE OPERATION OF FUEL CELLS

BACKGROUND AND SUMMARY OF THE INVENTION

This application claims the priority of German patent document 198 47 985.9, filed Oct. 17, 1998 (17.10.98) and PCT International Patent Application No. PCT/EP99/06854, filed Sep. 16, 1999 (16.09.99), the disclosure of which is expressly incorporated by reference herein.

The invention relates to a container for receiving an operating medium for the operation of a fuel cell.

Energy in fuel cells is obtained by a controlled reaction between hydrogen and oxygen, during which hydrogen ions and oxygen ions are bonded to form water at a membrane inside the fuel cell. It is known to supply the operating media in gas form from tanks belonging to the fuel cell. It is also known to obtain the operating medium oxygen from the ambient air.

Particularly when fuel cells are being used in nonstationary installations, such as for example vehicles, there are both restrictions with regard to the space available and safety concerns with regard to the transportation and/or storage of relatively large volumes of gaseous hydrogen. Also, particularly for fuel cell vehicles, it is necessary to ensure a sufficiently widespread supply of operating media, in particular hydrogen.

It has been proposed to obtain the hydrogen required from a hydrogen-containing or hydrocarbon-containing operating medium, preferably liquid methanol, the in a gas generation system by steam methanol reforming.

A significant advantage of using methanol is that methanol can be made available at filling stations at significantly lower cost than, for example, gaseous hydrogen. Prototypes of fuel cell vehicles are operated with chemically highly pure methanol, since undesirable admixtures in the operating medium may poison chemically active regions. By contrast, for economic operation of fuel cell vehicles in which it is possible to fill up with methanol at filling stations, the customary transport distances and transport methods mean that it is necessary to take into account a higher degree of contamination of the methanol than is tolerable in the various chemically active regions of the fuel cells.

One object of the present invention is to provide a container for receiving an operating medium for fuel cells which is also suitable for methanol with a low degree of purity.

This and other objects and advantages are achieved by the container according to the invention, which has at least one inlet for media, preferably operating media, a first outlet and a second outlet. The container is divided by at least one permeable component into at least an inlet-side interior space, and an interior space which is remote from the inlet. The first outlet is arranged in the inlet-side interior space and the second outlet is arranged in the interior space which is remote from the inlet.

In a first preferred embodiment, the permeable component is provided for the purpose of separating impurities out of the operating medium.

In another preferred embodiment, the permeable component is in contact with a first type of the operating medium in the inlet-side interior space and with a second type of the operating medium in the interior space which is remote from the inlet. The first type of the operating medium is less pure than the second type of the operating medium.

In a further preferred embodiment, the first type of the operating medium has a different chemical composition From the second type of the operating medium.

In still another preferred embodiment, the permeable component is in contact with operating medium in the inlet-side interior space and with impurities in the operating medium in the interior space which is remote from the inlet.

It is advantageous if the permeable component has a semi-permeable membrane and/or a molecular sieve and/or a ceramic body and/or a particle filter.

It is expedient to provide a connection to a vacuum pump in the interior space of the container which is remote from the inlet. A higher throughput of the medium passing through the permeable component is possible by reducing the partial pressure on one side.

A further expedient configuration is to provide a connection to a purge device in the outlet-side region of the container. The throughput of the medium passing through the permeable component can be increased by purging the interior space which is remote from the inlet with a purge medium.

In an especially preferred configuration, the operating medium contains methanol. It is expedient if the purified methanol can be supplied to a gas generation system for obtaining hydrogen. Furthermore, it is expedient if the impurities can be supplied to a catalytic burner unit. In this way, hydrocarbon impurities obtained from the methanol purification can advantageously be used to obtain process heat for any reformers, evaporators and/or gas-cleaning units.

It is preferred to use the container in a fuel cell vehicle.

Another preferred use of the container is in a refuelling installation for fuel cell vehicles. In this case, the vehicle can be filled with purified or at least pre-purified operating medium.

Other objects, advantages and novel features of the present invention will become apparent from the following detailed description of the invention when considered in conjunction with the accompanying drawings.

DETAILED DESCRIPTION OF THE DRAWINGS

In the text which follows, the invention is described as a container in a fuel cell vehicle in which the operating medium is methanol. However, the invention is not restricted to this application, but rather can also be used in stationary fuel cell systems or non-stationary fuel cell systems. Furthermore, other hydrogen-containing liquid or gaseous media can also be used instead of methanol.

For large-series and fleet deployment of fuel cell vehicles, a corresponding refuelling station infrastructure has to be created for suitable operating media, preferably methanol. However, since it must be accepted that vehicles with internal-combustion engines will be operated simultaneously for a prolonged period, it must be assumed that the long-distance transport and/or regional distribution of methanol will take place via pipelines and/or tankers which are also used to transport petrol and diesel.

Therefore, corresponding contamination of the methanol with higher hydrocarbons, for example alkanes, alkenes, aromatics and others up to a proportion of a few percent by volume (vol %), in particular up to 2 vol %, must be reckoned with. These hydrocarbons may lead to a reduction in the activity of the reforming catalyst which is to be used to obtain hydrogen from methanol and must therefore be removed from the methanol prior to the reforming process.

A preferred solution consists in purifying methanol which has been contaminated in this way with the aid of a permeable component, in particular a membrane, which is able to separate polar substances from nonpolar substances. Advantageous membrane materials are polymers, molecular sieves and/or porous ceramics. Permeable components, (particularly membranes) which are more permeable to one substance than to another substance are suitable.

The particular advantage is that purification of the operating medium may preferably take place in a fuel cell vehicle. Alternatively, corresponding purification of the operating medium may also take place directly at refuelling installations, for example in filling pumps. Particularly in the case of methanol as the operating medium, higher hydrocarbons are extracted as impurities, and these can advantageously be supplied on site for further use in petrol fuels.

A further preferred solution is to use a membrane at which chemical conversion from a mixture of substances to form the operating medium can take place, and in particular a molecular sieve can be used for this purpose.

Figure 1:
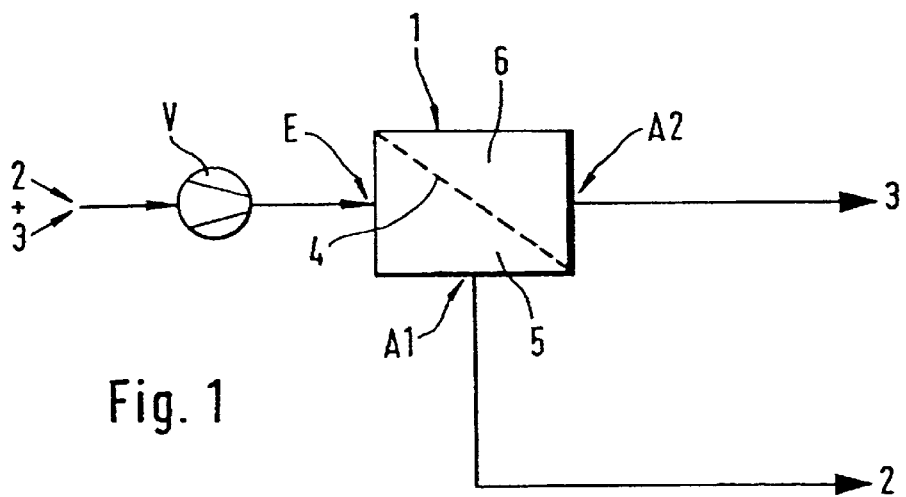
FIG. 1 is a schematic diagram of an arrangement with a permeable component in accordance with the invention.

An outline illustration of an arrangement with a permeable component according to the invention is sketched as a detailed view in FIG. 1. In a container 1, methanol is supplied, as a preferably liquid operating medium 2, together with any impurities 3, through an inlet E. An element V, preferably a valve and/or a pump, may be provided in the inlet region. A permeable component 4 is arranged in the interior of the container 1 in such a way that the interior of the container 1 is divided into at least two regions, namely an inlet-side interior space 5 and an interior space 6 which is remote from the inlet. A first outlet A1 is arranged in the inlet-side interior space 5, and a second outlet A2 is arranged in the interior space 6 which is remote from the inlet, through which outlets purified operating medium 2 and/or impurities 3 can be removed from the container 1.

If the permeable component 4 is more permeable to impurities 3 in the operating medium 2, the impurities 3 can permeate through the permeable component 4 and be discharged through the outlet A2. The operating medium 2 is retained as refined product and can be removed via the outlet A1. To increase the throughput of the permeate, the interior space 6 which is remote from the inlet can expediently be connected to a vacuum pump or a purge device, preferably a purge gas. The reduced partial pressure of the permeate in the interior space 6 which is remote from the inlet allows the throughput of the permeate through the permeable component 4 to be increased.

However, it is also possible to use a permeable component 4 which selectively preferably allows the operating medium 2 to permeate. In this case, the operating medium 2 can be removed from the outlet A2 and the impurities 3 from the outlet A1.

Figure 2:
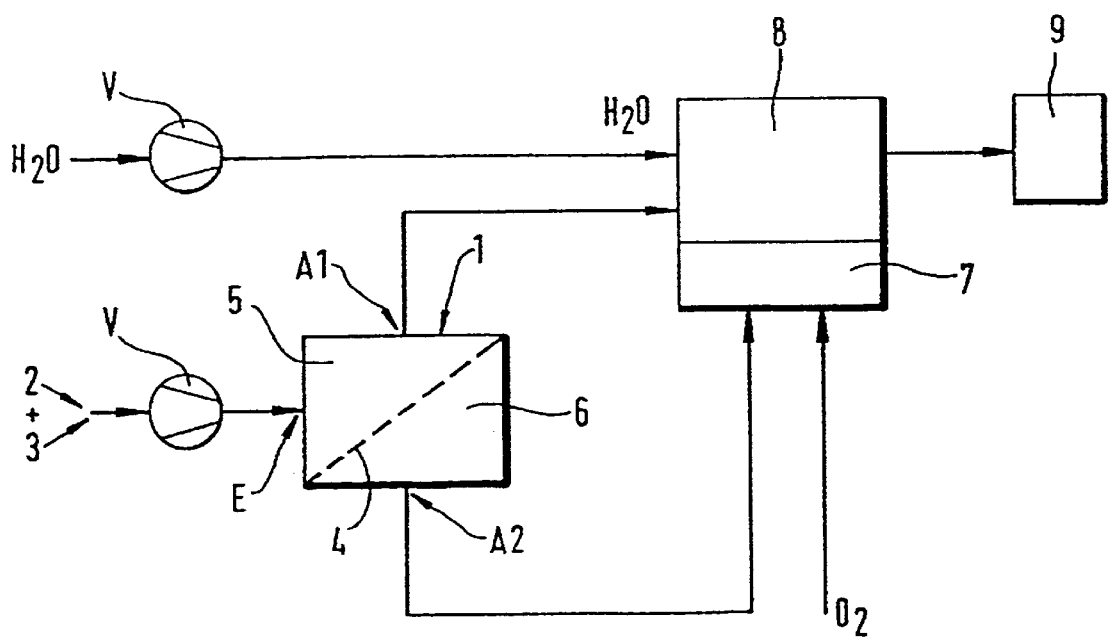
FIG. 2 is a schematic depiction of an arrangement according to the invention, with a permeable component in accordance with the invention.

FIG. 2 illustrates an advantageous configuration of an arrangement according to the invention in a fuel cell operating system. Methanol 2 with impurities 3 passes via a valve V into the inlet E of the container 1 which is designed as described in FIG. 1. Permeable component 4 divides the interior into an inlet-side interior space 5 and an interior space 6 which is remote from the inlet. Impurities 3 permeate through the permeable component 4 and are discharged via the outlet A2. The impurities 3 are then passed into a catalytic burner unit 7 and are burnt while air is supplied. The heat which is produced is available as process heat for various processors in the system.

Purified methanol 2 is supplied to a gas generation system 8 through the outlet A1 in the inlet-side interior space 5, and in the gas generation system it is wetted with supplied water and/or steam and is reformed. The hydrogen obtained from the methanol is then supplied to a fuel cell or a fuel cell stack 9.

Figure 3:
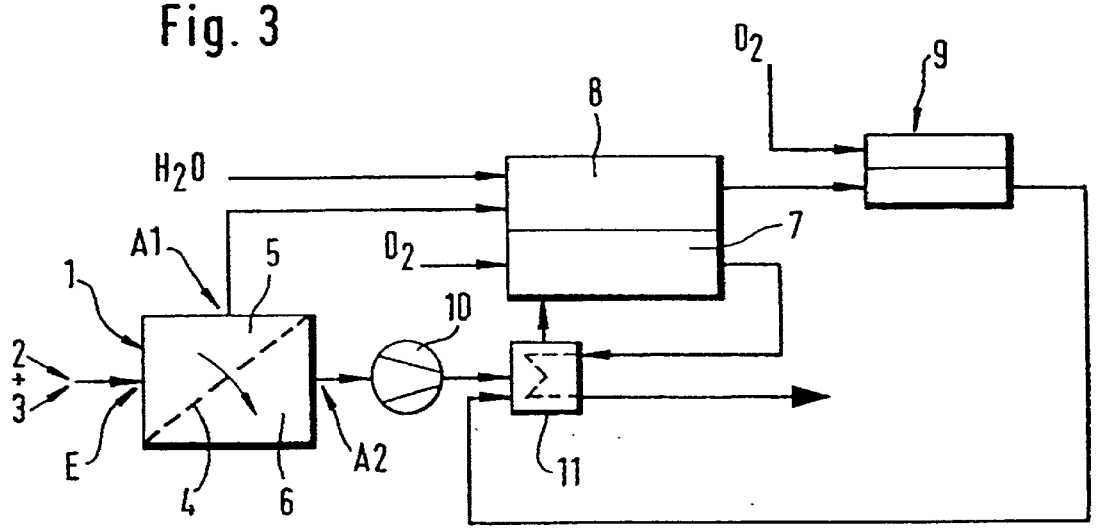
FIG. 3 shows a further configuration of an arrangement according to the invention with a permeable component in accordance with the invention.

FIG. 3 shows a further advantageous configuration. Methanol 2 with impurities 3 passes via a valve or a pump V into the inlet E of the container 1 which is designed as described in FIG. 1 and FIG. 2. Permeable component 4 divides the interior into an inlet-side interior space 5 and an interior space 6 which is remote from the inlet. Purified methanol 2 is supplied to a gas generation system 8 through the outlet A1 in the inlet-side interior space 5, and in the gas generation system is wetted with supplied water and/or steam and is reformed. The hydrogen obtained from the methanol is then supplied to a fuel cell or a fuel cell stack 9.

By contrast, impurities 3 permeate through the permeable component 4 and are discharged via the outlet A2. To increase the throughput of the impurities 3, the pervaporation process is preferably used. During pervaporation, the permeate undergoes a phase transition from liquid to gaseous. As with other membrane processes, the driving force for the pervaporation of a component is the gradient of its chemical potential. In the case of pervaporation, this gradient can preferably be achieved by lowering the partial pressure on the permeate side to below the saturation vapour pressure associated with the operating temperature, so that the permeate is evaporated during the desorption. Expediently, the inlet-remote interior space 6 of the container 1 is therefore connected to a vacuum pump 10 which evacuates the interior space 6 which is remote from the inlet. The flow of the impurities 3 which have been separated out is then supplied to a heater device 11 for preheating the impurities 3, which heater device is also supplied with exhaust gas from the fuel cell 9 and hot exhaust gas from the catalytic burner 7, for heat exchange with the impurities. The heated impurities 3 are supplied from the heater device 11 to the catalytic burner 7 or cooled exhaust gas is discharged from the heater device 11.

Figure 4:
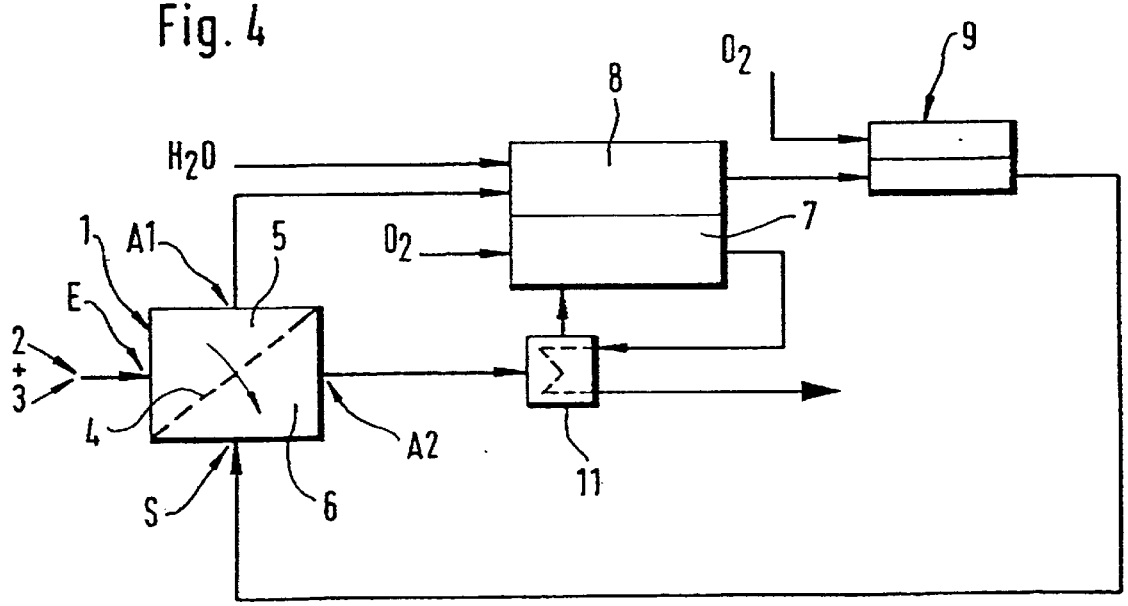
FIG. 4 shows a further configuration of an arrangement according to the invention.

FIG. 4 illustrates a further advantageous configuration. The structure substantially corresponds to the structure shown in FIG. 3. Methanol 2 with impurities 3 passes via a valve V into the inlet E of the container 1. Permeable component 4 divides the interior into an inlet-side interior space 5 and an interior space 6 which is remote from the inlet. Purified methanol 2 is supplied to a gas generation system 8 through the outlet A1 in the inlet-side interior space 5, and in the gas generation system it is wetted with supplied water and/or steam and is reformed. The hydrogen obtained from the methanol is then supplied to a fuel cell or a fuel cell stack 9.

By contrast, impurities 3 permeate through the permeable component 4 and are discharged via the outlet A2. To increase the throughput of the impurities 3, the pervaporation process is preferably employed. In this case, the partial pressure is reduced not by means of a vacuum pump but rather by means of a purge device, in that preferably anode exhaust gas from the fuel cell 9 is introduced, as purge gas, through the inlet S into the inlet-remote interior space 6 of the container.

The flow of the impurities 3 which have been separated is then supplied to a heater device 11 for preheating, which heater device is also supplied with hot exhaust gas from the catalytic burner 7. The heated impurities 3 are supplied from the heater device 11 to the catalytic burner 7, or cooled exhaust gas is discharged from the heater device 11.

If a permeable component 4 which is selectively permeable to the operating medium is selected, the outlet A2 is accordingly connected to the gas generation system 8, while outlet A1 can be directly or indirectly connected to the catalytic burner device 7.

The permeable component 4 may also be formed from a plurality of selectively permeable bodies, so that various substances from the supplied medium can be selectively separated from the desired operating medium 2. Preferably, a plurality of permeable components 4 are connected in series one behind the other. However, it is also possible for a plurality of permeable components 4 to be arranged next to one another or for permeable components 4 to be arranged parallel and behind one another. In this way, it is possible to optimize the selective separation of a plurality of different substances out of the operating medium.

A preferred permeable component 4 is a particle filter, and a particle filter is preferably provided in addition to a further membrane.

Advantageous embodiments of permeable component for separating oxygen-containing compounds (e.g., methanol and/or dimethyl ether and/or water) out of a hydrocarbon-containing mixture are briefly explained below. The preferred permeable component 4 is a membrane, preferred membrane materials comprising cellulose acetate and/or cellulose acetate butyrate and/or polyethylene and polyvinyl acetate and/or polyvinyl chloride and/or chlorinated polyethylene and/or polyvinyl chloride and/or polyvinylidene chloride.

A preferred membrane in which methanol is the predominant permeate at least comprises cellulose acetate and/or cellulose acetate butyrate.

A preferred membrane in which methanol is the predominant retentate is preferably selected from the group consisting of polyvinyl chloride and/or polyvinylidene chloride and/or polyethylene.

Depending on the permeable component selected, an addition of compounds such as for example ether may be appropriate in order to improve permeation or reduce permeation of methanol. A pressure difference between an inlet-side interior space 5 and an interior space 6 which is remote from the inlet may be advantageous, in which case a reduced pressure may be generated remote from the inlet or an excess pressure may be generated close to the inlet.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A container for receiving an operating medium for a fuel cell, comprising:
   an inlet for a medium;
   a first outlet;
   a second outlet;
   an inlet-side interior space; and
   an interior space which is remote from the inlet, and is separated from said inlet side interior space by a permeable component; wherein,
   the first outlet is arranged in the inlet-side interior space;
   the second outlet is arranged in the interior space which is remote from the inlet; and
   the container is arranged upstream of a gas generation system for obtaining hydrogen from the operating medium in order to supply the fuel cell, whereby operating medium which has been purified by the permeable component or has been chemically converted at the permeable component from a mixture of substances can be supplied to the gas generation system via the first or second outlet.

2. The container according to claim 1, wherein the permeable component separates impurities out of the operating medium.

3. The container according to claim 1, wherein the permeable component is in contact with a first type of the supplied medium in the inlet-side interior space and is in contact with a second type of the supplied medium in the interior space which is remote from the inlet.

4. The container according to claim 3, wherein the first type of the supplied medium has a lower degree of purity than the second type of the supplied medium.

5. The container according to claim 3, wherein the first type of the supplied medium has a different chemical composition from the second type of the supplied medium.

6. The container according to claim 1, wherein the permeable component is in contact with impurities of the operating medium in the interior space which is remote from the inlet.

7. The container according to claim 1, wherein the permeable component comprises at least one of a semipermeable membrane, a molecular sieve, a ceramic body, and a particular filter.

8. The container according to claim 1, wherein a connection to a vacuum pump is provided in the inlet-remote interior space of the container.

9. The container according to claim 1, wherein a connection to a purge device is provided in the inlet-remote interior space of the container.

10. The container according to claim 1, wherein the operating medium contains methanol.

11. The container according to claim 10, wherein methanol is supplied to a gas generation system in order to obtain hydrogen.

12. The container according to claim 2, wherein the impurities are supplied to a catalytic burner unit.

* * * * *